Patented Jan. 27, 1953

2,626,873

UNITED STATES PATENT OFFICE 2,626,873

METHOD OF IMPREGNATING CLOTH FOR REPAIRING METAL SURFACES

Charles H. Allen, Upper St. Clair Township, Allegheny County, Pa., assignor to Atomized Materials Company, Pittsburgh, Pa., a corporation of Pennsylvania No Drawing. Application November 2, 1949, Serial No. 125,172

2 Claims. (Cl. 117—7)

This invention relates to composite materials for use in patching metal surfaces, such as the fenders or bodies of automobiles, and it is among the objects thereof to provide a composite surfacing material of woven textile fabric compounded with a resinous material to form a stiffened fabric which, when treated with a solvent, becomes soft and tacky for adherence to metal surfaces and subsequently stiffens and becomes taut for treatment with finishing materials to constitute a replaced surface area that is capable of being painted and finished the same as the unpatched surface of the metal body.

It is a further object of the invention to provide a compounded woven textile fabric having strong specific adhesion for various metals in which the cloth or base is of suitable physical properties for feather-edging a repaired area.

It is still a further object of the invention to provide a method of treating composite woven fabric materials and a resin to break the continuity of the resinous film within the cloth web by stretching to assure tautness of the fabric after it has been resolvated and applied to a repaired area.

It is still a further object of the invention to select suitable resinous materials and a method of compounding them with the fabric to make them especially useful in repairing and refinishing metal surfaces.

In the practice of the invention the selection of the cloth is not as critical as selection of the resinous material. Any fabric which is partially felted or which has a light nap is satisfactory. The purposes of the felting or napping is to facilitate feather-edging or tapering of the cloth edges so as to form an invisible division line between the repaired area and the surrounding surface. A double napped sheeting flannel made of all cotton yarns is suitable for this purpose and it is compounded with the resinous substance by impregnation, such as by immersion dip tank processing with squeeze rolls for controlling the amount of the resinous material to be applied to the cloth. The impregnated fabric is then heated to evaporate the solvent, leaving the thermoplastic resinous composition in the cloth. The amount of impregnant is not critical but must be sufficient to give the solvated fabric adhesion to metals, etc.

Suitable resins to give the cloth the desired properties for repairing metal surfaces consist basically of a copolymer resin formed by polymerizing vinyl chloride, vinyl acetate and maleic acid or anhydride monomers in the ratios of about 86 to 13 to 1. These resins or combination of resins produce excellent adhesion to steel and other materials and have the desirable cloth impregnating properties and stiffness. The adhesion promoting tendencies are due primarily to the presence of the free acid groups (maleic) in this resin.

Th above-mentioned resin may be modified with other resins that are compatible and form homogeneous mixtures with it. Such materials include other polymers of the class characterized mainly by vinyl chloride or methyl, ethyl or butyl methacrylate, including copolymers of these with methyl or ethyl acrylate. The purpose of such modification is to increase the solids content of the impregnating lacquer, the viscosity of some of the above materials being lower than the base vinyl chloride-acetate maleic acid copolymer. The methacrylate polymers in particular also contribute materially to increased stiffness of the impregnated cloth, which is a desirable quality for most uses. It also is within the intended scope of this invention to modify the resin composition with a number of other resinous or oil-like materials to impart better adhesive properties, easier handling, stiffer physical properties or improved solvent and chemical resistance to the finished impregnated cloth.

The preparation of the solutions, and the impregnating lacquer and the method of impregnating are all in accordance with the conventional technology in the plastics, coatings and cloth converting industries. The actual solution preferred in practice consists of fifteen pounds polyvinyl chloride acetate maleic acid resin copolymerized to contain about an 86–13–1 ratio of the three components and two pounds of vinyl chloride acetate copolymer without the maleic acid modification dissolved in eighty three pounds of a thinner consisting essentially of a ketone or ester type solvent and an aromatic hydrocarbon diluent in 40–60 ratio by weight of solvent to diluent. This solution should be stabilized to prevent iron container corrosion by the inclusion of about 0.5% of propylene oxide. A separate solution in aromatic hydrocarbon (toluene) is prepared having 20 per cent ethyl methacrylate polymer, 10 per cent methyl methacrylate polymer and 10 per cent normal butyl methacrylate polymer with 60 per cent of the hydrocarbon. These two solutions are blended so as to contain up to 10 per cent by weight of the methacrylate solution and ninety per cent or more of the vinyl resin solution. In practice, this composition is pigmented in order to impart a definite distinguishing color to the finished impregnated cloth. This pigment dispersion is prepared by conventional technique using a pebble mill. Thirty parts of polyvinyl chloride acetate resin, six parts methyl isobutyl ketone, one part diisobutyl ketone, fifty-five parts aromatic hydrocarbon solvent, one part resin plasticizer such as dioctylphthalate etc., and seven parts of a pigment color are charged to the mill and ground until the pigment is well dispersed. The dispersion is added to the basic solution in sufficient quantity (10–12%) to develop the desired distinguishing color.

After the cloth has been processed by impregnation and the solvent has been driven off, it is subjected to a calendering or steel squeeze roll operation which breaks the continuity of the resinous film within the cloth web by stretching that takes place as a result of the rolling. This stretching and consequent film disruption is essential in order to insure that sufficient shrinkage takes place on drying to make the fabric composition taut when the cloth is subsequently softened by a solvent and applied over a hole in a metal surface. The shrinkage phenomenon comes about as a result of the strong surface tension effect of the solvated resin fragments within the cloth web tending to pull together to again form a continuous film. This shrinkage is to be differentiated from the natural shrinkage within the molecular structure of the resin upon drying of solvent from it. This latter shrinkage is not sufficient to bring about the desired tautening effect, and it is an important feature of this invention that the tautening effect is produced by the above-mentioned resin film disrupting operation.

It is to be understood that the film disruption is the important feature, and the means for accomplishing it is secondary. For example, it is within the scope of this invention to accomplish this film fragmentation by using an emulsion of the resin binder solution rather than the straight solution. Upon rapid heating of the cloth which has been dipped in this emulsion, the volatilization of the water and solvent will cause the film continuity to be disturbed in such a way that the desired film breaking will have been accomplished. Another alternate method of performing this operation is to impregnate the cloth in the solution as given in the first method. Then, before the impregnated cloth is dry or free of the resin solvent, the web is subjected to a steaming. This steaming operation introduces water into the film, and since water is a precipitant for the resin being used, it causes the film to become discontinuous by reason of partial precipitation of the resin within the cloth web.

A composite resinous fabric compounded and processed as hereinabove described strongly adheres to various metals by treating it with a proper solvent, such as ketone solvent, to soften the material. It is applied to a metal surface as follows: The metal surface must be cleaned bright by sanding down over an area of from one to three inches width around the hole or area to be repaired. The impregnated cloth is then dipped in an activating solvent to solvate the contained resin, and the wet tacky fabric is then placed on the bare metal surface around the hole or area to be treated. As the solvent dries the cloth is pressed against the metal and the edges of the cloth are tapered by pressing and rubbing to form a feather-edge with the metal surface. The patch is then allowed to dry and shrink and become stiff and taut, after which finishing materials such as so-called plastic metallic putties are applied to impart to the cloth surface a metallic surface and assist in obtaining a better featheredge. The finished surface may be painted and rubbed the same as a metal surface, and while the invention has been described as particularly useful in patching holes or corroded areas of automobiles, it has other uses as follows.

Other uses to which the impregnated cloth may be applied include the preparation of various formed shapes such as boxes, display panels, mannequins, etc. The unique combination of the impregnated cloth as a base with the metallic putty as a top covering would make possible the preparation of these boxes and other forms having a metallic surface due to the well known property of the putty which causes it to resemble polished metal when it is buffed to bring up the metallic finish. The impregnated cloth is valuable as an insulating material due to the low conductivity of the cloth and the contained resins. It may also be used to laminate all types of metal, wood or other sheets, due to its strong adhesive properties when activated with solvent. For this same reason, it is useful as a backing to strengthen thin metal sheets or as a sound deadening and insulating material for metal sheets. It may also be used as a surface for metal sheets which may be embossed to resemble leather or other surfaces. The fire resistant properties of this treated fabric also give it special utility in instances where this is an important requirement. For example, the formed boxes, mannequins and other forms mentioned above would have special value for use in department stores and such places due to this property. It might be noted here that the fabric as described will burn if fired by an outside source and may continue to smolder after the flame is removed. However, this may be made completely flameproof by the inclusion of antimony oxide or other flameproofing agent as part of the pigment.

Although one embodiment of the invention has been herein illustrated and described, it will be evident to those skilled in the art that various modifications may be made in the selection of materials and the compounding and processing thereof without departing from the principles herein set forth.

I claim:

1. The method of making composite sheet material which comprises impregnating a textile fabric with a solution consisting of polyvinyl chloride acetate maleic acid resin copolymerized to contain approximately an 86–13–1 ratio of the three components and vinyl chloride acetate copolymer without the maleic acid modification dissolved in a thinner consisting essentially of a ketone or ester type solvent and an aromatic hydrocarbon diluent in 40–60 ratio by weight of solvent to diluent, blended 90 per cent or more with a solution having 20 per cent ethyl methacrylate polymer, 10 per cent methyl methacrylate polymer and 10 per cent normal butyl methacrylate polymer with 60 per cent of aromatic hydrocarbon, removing the excess solution from the impregnated fabric and driving off the solvent to produce a stiffened fabric composition which may be resoftened by use of a ketone solvent.

2. In the method of making composite sheet material as set forth in claim 1, the step of stretching the impregnated textile fabric after the solvent has been driven off to break the continuity of the resinous film.

CHARLES H. ALLEN.

REFERENCES CITED

The following references are of record in the file of this patent:

UNITED STATES PATENTS

| Number | Name | Date |
|---|---|---|
| 2,014,068 | Hutchman | Sept. 10, 1935 |
| 2,275,957 | Groff | Mar. 10, 1942 |
| 2,318,780 | Humphrey | May 11, 1943 |
| 2,329,456 | Campbell | Sept. 14, 1943 |
| 2,373,954 | Frankfurther | Apr. 17, 1945 |